United States Patent [19]

Sakura et al.

[11] Patent Number: 4,641,147
[45] Date of Patent: Feb. 3, 1987

[54] THERMAL PRINTER

[75] Inventors: Yasuhiro Sakura; Hitoshi Nimura; Mamoru Ishikawa, all of Shizuoka, Japan

[73] Assignee: Tokyo Electric Co., Ltd., Tokyo, Japan

[21] Appl. No.: 829,613

[22] Filed: Feb. 14, 1986

[30] Foreign Application Priority Data

Feb. 22, 1985 [JP] Japan .................................. 60-33715

[51] Int. Cl.$^4$ ............................................ G01D 15/10
[52] U.S. Cl. ................................ 346/76 PH; 346/106; 400/120; 400/240
[58] Field of Search .......................... 346/76 PH, 106; 400/120, 240; 219/216 PH

[56] References Cited

U.S. PATENT DOCUMENTS 4,590,489  5/1986  Tsumura et al. ............... 346/76 PH
4,590,490  5/1986  Takanashi et al. ............. 346/74 PH Primary Examiner—Arthur G. Evans
Attorney, Agent, or Firm—Oblon, Fisher, Spivak, McClelland & Maier

[57] ABSTRACT

The present invention is equipped with a plurality of print buffers for inputting print data into a thermal head, wherein such print data are selectively fed to simply change the current on-time for energizing the heating elements of the thermal head relative to specific information out of the entire information to be printed, so that the specific information is printed emphatically in a particular color to become conspicuous, and simultaneously the contour of each specific character is edged in a basic color to be distinctly legible. Such edged print is attained by utilizing the gradient of the temperature distribution induced in the heating elements by the current on-time control system, hence eliminating the necessity of any edging print data to consequently simplify the control.

3 Claims, 6 Drawing Figures

F I G. 3
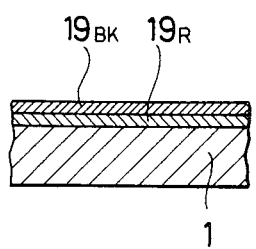
F I G. 4
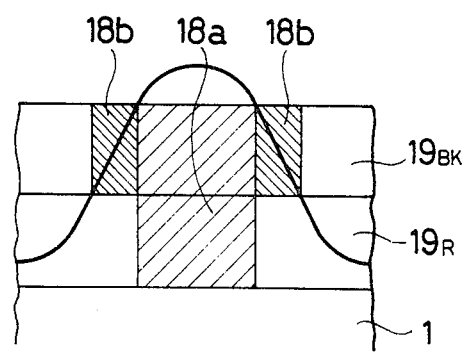

THERMAL PRINTER

FIELD OF THE INVENTION AND RELATED ART STATEMENT

The present invention relates to a weighing-printing apparatus designed for printing scaled weight data and other contents on a recording paper by means of a thermal head.

In general, employment of a thermal head as a printing means in a label printer or the like brings about a variety of advantages including capabilities for forming any desired print pattern and realizing clear printing of a bar code. However, since the print color on the label as recording paper is merely a prescribed one alone over the entirety thereof, when it is required to render some specific portion of the printed information conspicuous for the purpose of emphasis, such portion is customarily enclosed with a line or is printed in a thicker style. Although the above purpose is achievable to a certain degree by such conventional means, its effect is within the extent that sufficient care is needed for recognition of the emphasis, and the emphasized portion is not remarkably distinguishable at a glance.

The purpose mentioned can be accomplished with facility by multicolor printing, which however requires two or more thermal heads to consequently complicate the structure of the printing mechanism.

There is known a conventional apparatus which uses a single thermal head and a label having dichromatic color-forming temperature characteristic thereto, wherein the current on-time to energize the heating elements of the thermal head is so controlled as to print a desired label portion in red for optically emphasizing it. However, although the emphatic portion is printable in red according to such system, there still arises a problem that the contour of each emphasized character becomes indistinct to consequently bring about failure in attaining satisfactory legibility.

OBJECT AND SUMMARY OF THE INVENTION

It is a first object of the present invention to display any desired label portion, which needs to be emphasized out of the entire print information, in a particular color different from an ordinary one.

And a second object of the invention resides in rendering the character contour distinct.

The present invention is equipped with recording paper each having multi-color-forming temperature characteristic, a thermal head containing a multiplicity of heating elements and capable of printing the recording paper over the entire width thereof while being kept in contact therewith during its unidirectional motion, at least two print buffers for feeding print data to control energization of the heating elements of the thermal head, and a current on-time control circuit for differentially setting the on-time periods of a constant current to the heating elements of the thermal head in response to selection of the print buffers under the predetermined condition that a basic color for general print data is formed at a low temperature while a different particular color for specific print data is formed at a high temperature in a printing operation on the recording paper by the heating elements of the thermal head, wherein thermal energy derived from the heating elements and transmitted to the recording paper in a high-temperature particular-color print mode for specific characters is so generated as to have a temperature gradient, by which the contour of each specific character is treated in a low-temperature basic-color print mode and is thereby edged in the basic color.

The specific characters to be emphasized are printed in a different particular color at a high temperature in such a manner as to be distinguished from the general information which is printed in a basic color formed at a low temperature. In the above operation, the contour of each specific character comes to be edged in the basic color so that the specific character is rendered conspicuous with high legibility. Such edged print is realized by utilizing the temperature gradient obtained on the basis of controlling the current on-time that corresponds to the thermal energy transmitted from the heating elements to the label, hence eliminating the necessity of edge print data to consequently simplify the control.

BRIEF DESCRIPTION OF THE DRAWINGS

FIG. 3 is a sectional view showing an enlarged portion of the label;

FIG. 4 illustrates a temperature distribution in the label;

DETAILED DESCRIPTION OF PREFERRED EMBODIMENTS

Figure 2:
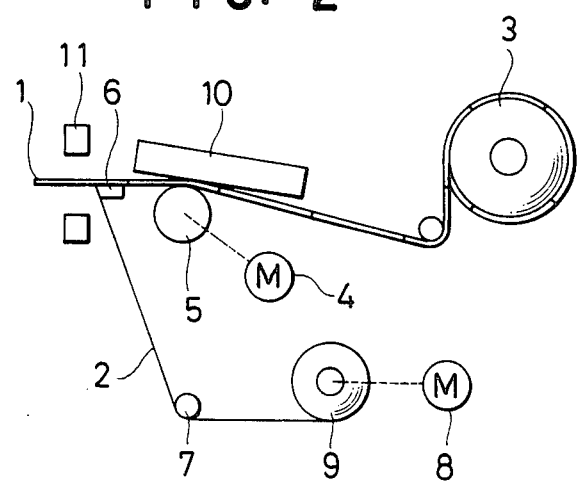
FIG. 2 is a side view of a partial mechanism in a label printer.

Hereinafter an exemplary embodiment of the present invention will be described with reference to the accompanying drawings. First, as illustrated in FIG. 2, rectangular labels 1 as recording paper are attached at equal intervals onto an elongated mount paper 2 which is wound in the shape of a roll and is held on a label supply reel 3. The mount paper 2 moved forward via a platen 5 driven by a pulse motor 4 is bent through a label stripper plate 6 and then is wound, by way of a roller 7, around a takeup shaft 9 rotated by a takeup motor 8. A thermal head 10 is located on the platen 5, and the label 1 separated by the label stripper plate 6 is forwarded to a label detector 11, which then detects the presence or absence of the label 1 photoelectrically while detecting the passage timing of its leading edge.

Figure 1:
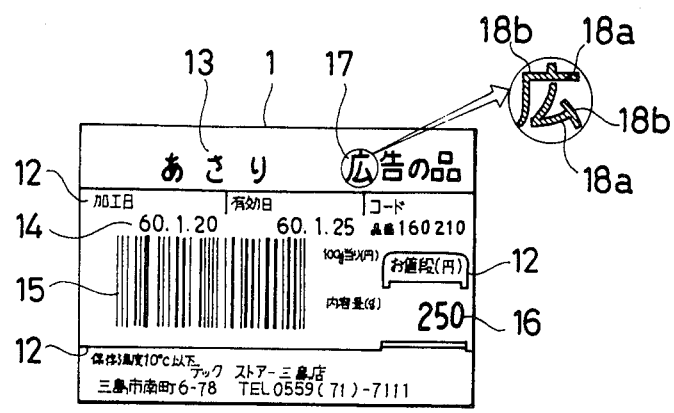
FIG. 1 is a plan view of a label.

FIG. 1 shows exemplary contents printed on the label 1. The peculiar information 12 preprinted on the label 1 includes production date, efficacy date, code, article number, unit price ( ) per 100 g, quantity (g), shop name, partition line (printed in, e.g. blue); and price ( ) (printed in, e.g. white on red ground). In addition thereto, specific information 17 including article name 13, date 14, bar code 15, data 16, "advertised article" and so forth is printed by the thermal head 10. The "advertised article" in the specific information 17 is the portion to be emphasized in this embodiment, and it is printed by the undermentioned means in a particular color which is different from the ordinary color of the other printed portions. In further detail, the label 1 has, on its surface, two color forming layers 19BK and 19R with dichromatic temperature characteristic as shown in FIG. 3, wherein the upper color forming layer 19BK is used for a basic color such as black while the lower color forming layer 19R is used for an emphatic particular color such as red. In this example, when the current supplied to the heating elements of the thermal head 10 is kept constant, the basic color (black) is formed on the label 1 in a low temperature mode during which the current on-time is short, and the particular color (red) is formed in a high temperature mode during which the current on-time is long.

Figure 5:
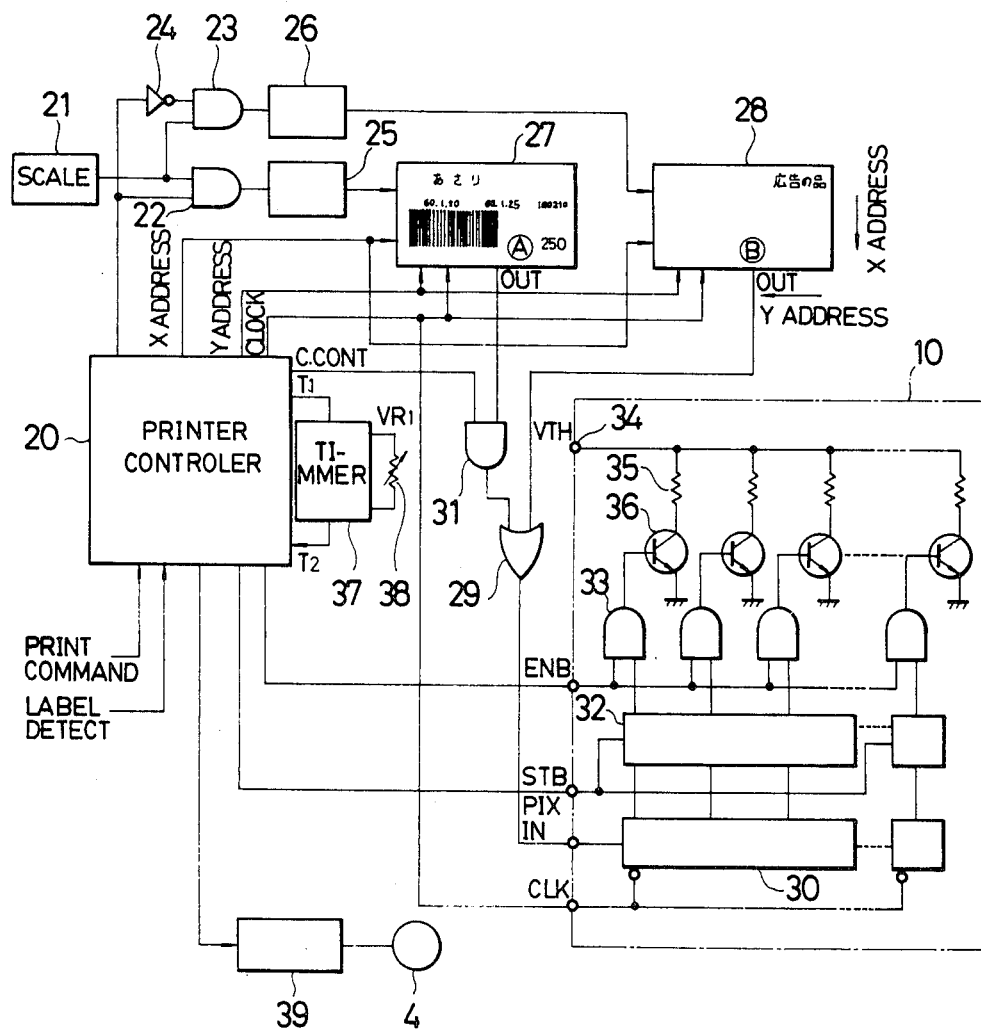
FIG. 5 is a block diagram of electric circuits.

Now the electric circuit configuration will be described below with reference to FIG. 5, wherein a printer controller 20 is so incorporated as to operate in response to a print command or a label detection signal. A scale 21 is connected to one input of each of two AND gates 22 and 23, and the controller 20 is connected either directly or through an inverter 24 to another input of each of the AND gates 22 and 23. A first print buffer 27 and a second print buffer 28 are connected via character generator converters 25 and 26 respectively to the outputs of the AND gates 22 and 23. And the controller 20 is further connected via an X address line, a Y address line and a clock line to both the print buffers 27 and 28.

The second print buffer 28 is connected via an OR gate 29 to a shift register 30 in the thermal head 10. Meanwhile the first print buffer 27 is connected to the input of an AND gate 31 together with a color control signal (C. CONT) obtained from the printer controller 20, and the AND gate 31 is connected to the OR gate 29.

In the internal structure of the thermal head 10, the following operation is performed. First, data of the print buffers 27 and 28 are inputted bit by bit to the shift register 30 by the use of clock pulses (CLK), and the content of the shift register 30 is transferred bit by bit to a latch circuit 32, which is connected in parallel thereto, by the use of a strobe signal (STB). To the latch circuit 32 are connected AND gates 36 which control the current fed to the heating elements 35 connected in common to a power supply 34 via a multiplicity of AND gates 33. The AND gates 36 are opened by an enable signal (ENB).

A timer 37 serving as a current on-time control circuit is connected to the printer controller 20. The timer 37 is started in response to a signal representative of a time T1 and functions to determine a time T2, during which the contents of both the first print buffer 27 and the second print buffer 28 are printed simultaneously, as will be described later. And a variable resistor 38 is connected to the timer 37 for adjusting the time T2.

Furthermore, a motor driver 39 coupled to the pulse motor 4 is connected to the printer controller 20 so as to control the forward motion of the label 1.

In the structure mentioned above, a strobe signal STB and an enable signal ENB are generated respectively at the rise of T1 and the rise of T2. Assume now that the period T1 corresponds to the time required for printing one line in a different particular color on the label 1, and the pulse motor 4 is driven cyclically per T1 to feed the label 1 by one line. It is defined here that "one-line printing" relates to one line of unitary dots, not to one line of characters. The time T2 is determined by the timer 36, and the period T1 is divided into the time T2 and the time (T1−T2). It is supposed here that the output of the timer 36 is turned to a high level after the lapse of T2 from the start of T1.

The printing operation will be described below with the first print buffer 27 referred to as A memory and the second print buffer 28 as B memory. Regarding the contents stored in the A and B memories, X addresses denote those for individual lines, and Y addresses denote those in each line. Consequently the print contents of 0, 1, 2 . . . Y, Y are existent in each of the X addresses.

Figure 6:
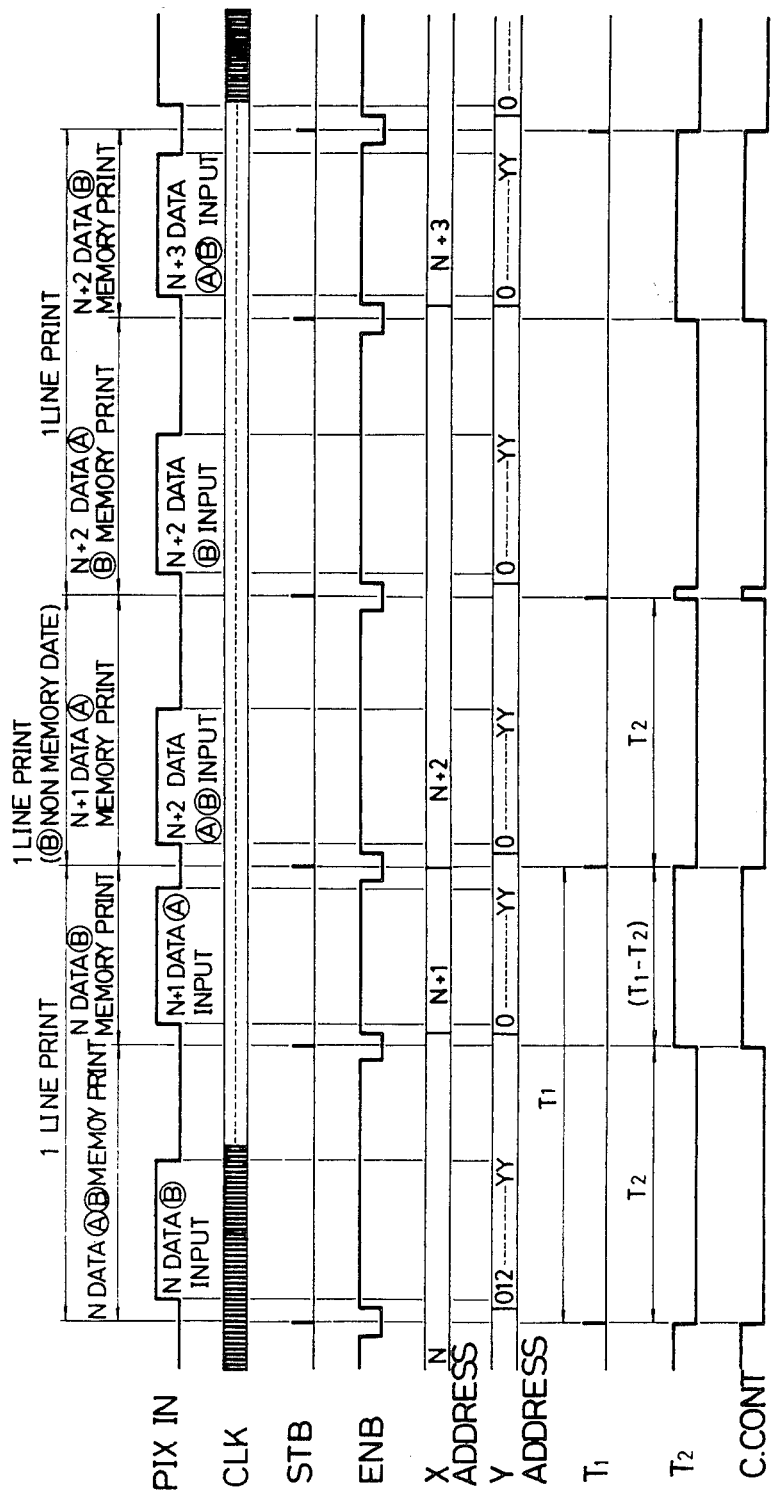
FIG. 6 is a timing chart.

Referring now to the timing chart of FIG. 6, the operation starts from "N DATA A B MEMORY PRINT". In this portion, the heating elements 35 begin to be energized according to the data already inputted to the shift register 30 in response to the STB signal and the ENB signal based on T1. Since T2 is still at a low level in this stage, the C. CONT signal also remains at a low level and therefore so serves as not to feed the output of the A memory to the thermal head 10. Consequently, at this moment, input data to the thermal head 10 is merely the content of the B memory, and the content actually printed is based on the data inputted immediately anterior to this stage.

After the lapse of the time T2, the content of the B memory inputted to the shift register 30 is then applied to the latch circuit 32 to energize the heating elements 35. Consequently the content of the B memory inputted previously is printed. Since T2 is at a high level, the C. CONT signal is also at a high level so that the data from both the A and B memories are inputted to the shift register 30 in the thermal head 10.

The label 1 fed by one line cyclically in the period T1 receives the combined contents of the A and B memories and the content of the B memory alternately within the time length divided into a time (T1−T2) and a time T2, and is so processed as to print the received contents sequentially. Since the current on-time for energization including merely T2 becomes short to induce a low temperature, the content for the general print data such as the article name 13 stored in the A memory is printed in the basic color (black). Meanwhile, the specific information 17 of "advertised article" in the content of the B memory is printed in the different particular color (red) as the heating elements 35 are energized for the time T1 which is long to induce a high temperature. Thus, the resultant color comes to be different from the other information such as the article name 13 and so forth which are printed only within the short energization time T2, whereby the specific information 17 is rendered distinguishable with remarkable definition.

The operation described above is performed relative to the print line including the specific information 17 which is to be printed in the different particular color. In this embodiment, the print time is shortened for any print line of the bar code or the like where none of the different particular color is required, as shown in the second one-line print portion in FIG. 6. It corresponds to the case where none of the specific information 17 is stored in the related B memory, and the data is stored merely in the A memory alone. Then, prior to lapse of the time T1, the current is supplied during the time T2 required for printing the article name 13 and so forth and, posterior to the basic color (black) print time, a pulse of T1 is outputted for printing the next line. Therefore, the required print time is shortened in the line without any of the specific information 17 to consequently reduce the entire label issuing time, hence enhancing the operational efficiency thereof. In other words, the current on-time corresponding to the print time is extended in this embodiment only for the line requiring print in the different particular color.

In a practical operation, the variable resistor 38 is adjusted properly to change the time T2. Such adjustment is executed in accordance with the paper quality of the label 1 and so forth.

In this exemplary embodiment, the aforesaid characters representing "advertised article" are visually emphasized in red and edged in black along the contours thereof, as shown in FIG. 1 with an enlarged view enclosed with a circle. A character portion 18a is printed to appear red in a high-temperature particular-color print mode while a contour portion 18b is printed to appear black in a low-temperature basic-color print mode, so that the character portion 18a is edged in black. Such edged print is realized by utilizing the gradient of the temperature distribution which is obtained through control of the current on-time to adjust the thermal energy transmitted from the heating elements 35 to the label 1. The state mentioned is illustrated in FIG. 4, where the thermal energy generated from the heating elements 35 is imparted first to the basic color forming layer 19BK of the label 1 in an amount corresponding to unitary dots. Since the current on-time is set to be longer in the red print mode, the temperature distribution obtained in this mode comes to have the characteristic of FIG. 6 with a gradient extending wider than the dot from the basic color forming layer 19BK toward the particular color forming layer 19R. Therefore, when the heat generating current is applied for the same period of time as that in the red print mode, the dot body (i.e. character portion 18a) is subjected to a predetermined amount of high-temperature energy and is thereby printed in red, while the dot periphery (i.e. contour portion 18b) is subjected to a smaller amount of thermal energy and is thereby printed in black at a low temperature to eventually edge the character portion. It is also possible to bring out red in the label 1 by applying high thermal energy thereto for a short period of time, but such control system fails to induce a desired gradient in the temperature distribution and hence causes red print in the dot body alone. Accordingly the current on-time control system employed in the above exemplary embodiment applied low thermal energy to induce a gradient in the temperature distribution. Thus, the characters of the specific information 17 are printed in red with black edges and are thereby rendered legible distinctly with visual emphasis. It is to be especially noted that none of edging print data is required in the embodiment since it utilizes the temperature gradient of the heating elements 35 for the label 1, hence simplifying the control.

Although in the above embodiment the "advertised article" is selectively printed in a different particular color as the specific information 17, such particular-color printing may also be performed under the condition that individual items of various print groups (peculiar information 12) determined by preprinting on the label 1 are selectable with mutual combination. In a modification of using a non-preprinted label 1, the peculiar information 12 including a production date and so forth may be printed in a different particular color by the thermal head 10 in the same manner as the aforementioned, while the general data including an article name 13 and so forth may be printed in a basic color. Furthermore, when the characters such as "advertised article" to be emphasized are printed on a preprinted label 1, as already described in connection with the foregoing embodiment, a sum (price) calculated from (scaled weight)×(unit price) may be printed in the different particular color to become conspicuous. Especially when the unit price is low as in this exemplary embodiment where the emphasized message includes "advertised article", it is preferred that the unit price be printed in the different particular color (red). And also in such particular color print mode, the emphatic characters can be edged in black as well. In such particular-color printing operation, flags (e.g. red=1, black=0) for selecting a red print mode or a black print mode may be previously stored in flag memories by a keyboard or flag setting commands with respect to the individual items of article name, auxiliary characters (e.g. advertised article), weight and price. And in the stage of preparing memory data to be stored in the print buffers 27 and 28, black-forming data may be produced for the print buffer 27 and red-forming data for the print buffer 28 respectively in accordance with such selection flags.

What is claimed is:

1. A thermal printer comprising: recording papers each having multi-color-forming temperature characteristic; a thermal head containing a multiplicity of heating elements and capable of printing the recording paper over the entire width thereof while being kept in contact therewith during its unidirectional motion; at least two print buffers for feeding print data to control energization of the heating elements of said thermal head; and a current on-time control circuit for differentially setting the on-time periods of a constant current to the heating elements of said thermal head in response to selection of said print buffers under the predetermined condition that a basic color for general print data is formed at a low temperature while a different particular color for specific print data is formed at a high temperature in a printing operation on the recording paper by the heating elements of said thermal head, wherein a temperature gradient is induced relative to the thermal energy generated from said heating elements and transmitted to said recording paper when printing the specific characters in a high-temperature particular-color print mode, and the contours of said specific characters are treated at the low temperature for the basic color due to said temperature gradient so that each of the printed specific character is edged in the basic color.

2. The thermal printer as defined in claim 1, wherein said basic color is black and said particular color is red.

3. The thermal printer as defined in claim 1, wherein said specific characters are printed in red and edged in black.

* * * * *